US011831854B2

(12) United States Patent
Ohata

(10) Patent No.: US 11,831,854 B2
(45) Date of Patent: Nov. 28, 2023

(54) INFORMATION PROCESSING SYSTEM, INFORMATION PROCESSING METHOD, AND COMPUTER PROGRAM

(71) Applicant: Sony Interactive Entertainment Inc., Tokyo (JP)

(72) Inventor: Koji Ohata, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/312,111

(22) PCT Filed: Dec. 17, 2018

(86) PCT No.: PCT/JP2018/046288
§ 371 (c)(1),
(2) Date: Jun. 9, 2021

(87) PCT Pub. No.: WO2020/129115
PCT Pub. Date: Jun. 25, 2020

(65) Prior Publication Data
US 2022/0030210 A1 Jan. 27, 2022

(51) Int. Cl.
*H04N 13/122* (2018.01)
*H04N 13/156* (2018.01)
*H04N 13/344* (2018.01)
*H04N 13/366* (2018.01)

(52) U.S. Cl.
CPC ......... *H04N 13/122* (2018.05); *H04N 13/156* (2018.05); *H04N 13/344* (2018.05); *H04N 13/366* (2018.05)

(58) Field of Classification Search
CPC .. H04N 13/122; H04N 13/156; H04N 13/344; H04N 13/366

USPC ........................................................ 348/43
See application file for complete search history.

(56) References Cited

U.S. PATENT DOCUMENTS

| 10,636,185 | B2 | 4/2020 | Wu |
| 10,748,341 | B2* | 8/2020 | Ogasawara ........... A63F 13/327 |
| 10,796,489 | B1* | 10/2020 | Cordes .................. A63F 13/655 |
| 11,093,025 | B2* | 8/2021 | Kakehashi ......... H04N 21/4728 |

(Continued)

FOREIGN PATENT DOCUMENTS

| EP | 0920198 A1 | 6/1999 |
| JP | 07168121 A | 7/1995 |

(Continued)

OTHER PUBLICATIONS

International Preliminary Report on Patentability and Written Opinion for corresponding PCT Application PCT/JP2018/046288, 15 pages, dated Jul. 1, 2021.

(Continued)

*Primary Examiner* — Tung T Vo
(74) *Attorney, Agent, or Firm* — Matthew B. Dernier, Esq.

(57) ABSTRACT

An information processing apparatus acquires a first image obtained by imaging a real space. The information processing apparatus generates a display image by merging the first image into a second image representing a virtual space to be presented to a user wearing a head-mounted display (HMD), the display image being configured such that the first image has an inconspicuous border. The information processing apparatus displays the generated display image on the HMD.

9 Claims, 11 Drawing Sheets

(56) References Cited

U.S. PATENT DOCUMENTS

| | | | |
|---|---|---|---|
| 11,263,813 B2* | 3/2022 | Ohashi | G06F 3/0304 |
| 11,288,733 B2* | 3/2022 | Scholl | G06Q 30/0633 |
| 11,393,176 B2* | 7/2022 | Shriram | G06V 20/647 |
| 2002/0177481 A1* | 11/2002 | Kitsutaka | G06T 15/20 463/30 |
| 2003/0020716 A1* | 1/2003 | Ouchi | G06T 15/10 345/427 |
| 2004/0105579 A1* | 6/2004 | Ishii | G06T 7/593 348/E7.086 |
| 2012/0044260 A1 | 2/2012 | Hirai | |
| 2012/0182399 A1* | 7/2012 | Andersson | H04N 13/221 348/47 |
| 2014/0092221 A1* | 4/2014 | Nagai | H04N 13/261 348/51 |
| 2014/0362188 A1* | 12/2014 | Yokokawa | G06F 3/011 348/47 |
| 2015/0294492 A1* | 10/2015 | Koch | H04N 13/243 345/426 |
| 2016/0379407 A1* | 12/2016 | Foster | G06T 19/006 345/633 |
| 2017/0053452 A1* | 2/2017 | Arai | G02B 27/0093 |
| 2017/0193679 A1 | 7/2017 | Wu | |
| 2018/0321798 A1 | 11/2018 | Kawamura | |
| 2019/0358547 A1* | 11/2019 | Mack | H04N 21/2187 |
| 2020/0167996 A1* | 5/2020 | Watanabe | B60R 1/00 |
| 2020/0371737 A1* | 11/2020 | Leppanen | G06F 3/1454 |
| 2020/0410960 A1* | 12/2020 | Saito | G06F 3/0484 |
| 2021/0204014 A1* | 7/2021 | Kawakami | G06T 19/00 |
| 2021/0211632 A1* | 7/2021 | Kawakami | H04N 21/234 |
| 2021/0248788 A1* | 8/2021 | Imao | G06N 3/0454 |
| 2021/0248803 A1* | 8/2021 | Kojima | G06T 13/40 |

FOREIGN PATENT DOCUMENTS

| | | |
|---|---|---|
| JP | 10229535 A | 8/1998 |
| JP | 2004328241 A | 11/2004 |
| JP | 2012044407 A | 3/2012 |
| JP | 2015228050 A | 12/2015 |
| JP | 2016062486 A | 4/2016 |
| JP | 2017138913 A | 8/2017 |
| WO | 2017029918 A1 | 2/2017 |
| WO | 2017110632 A1 | 6/2017 |

OTHER PUBLICATIONS

International Search Report for corresponding PCT Application PCT/JP2018/046288, 4 pages, dated Feb. 26, 2019.

\* cited by examiner

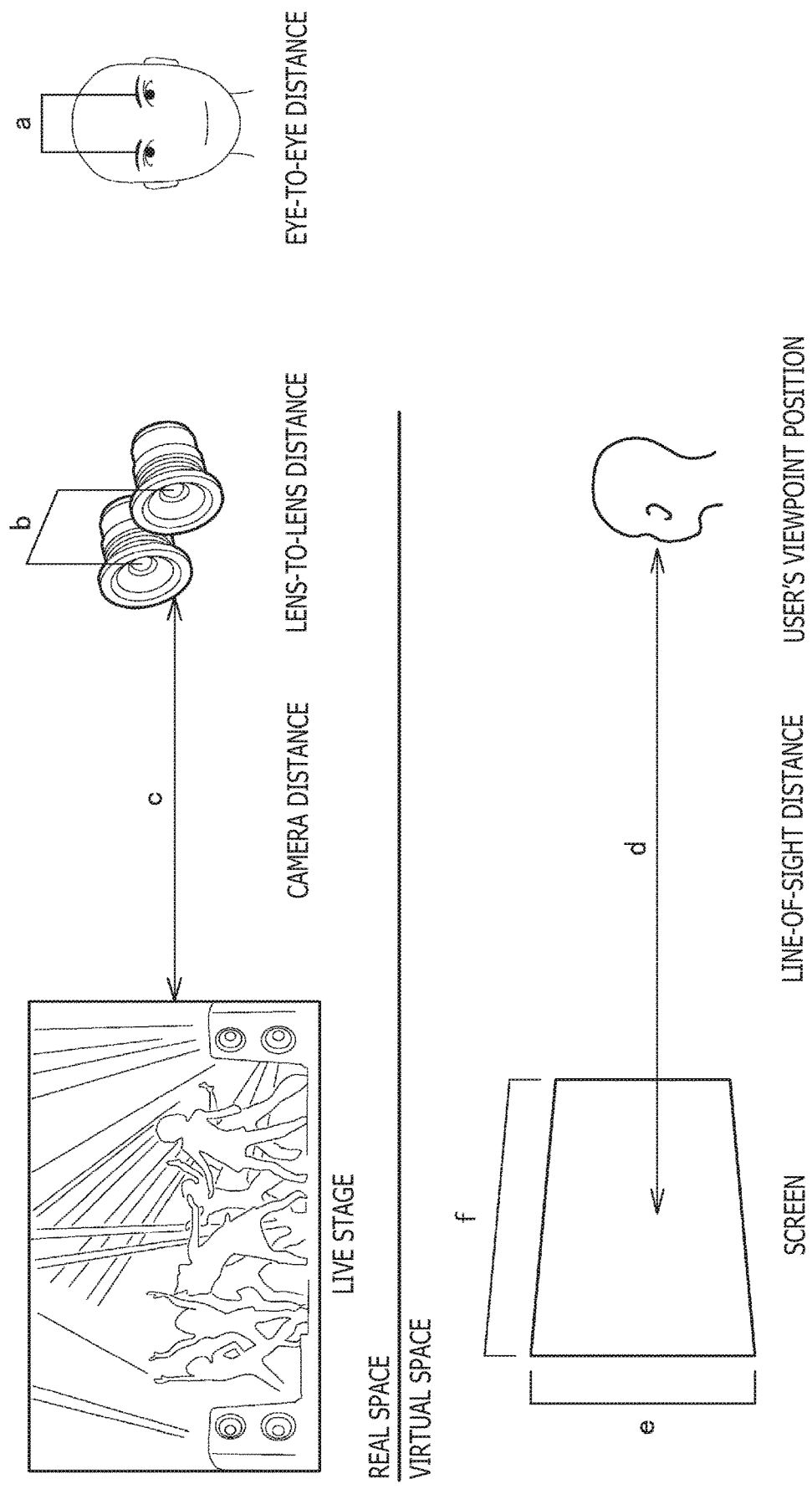

INFORMATION PROCESSING SYSTEM, INFORMATION PROCESSING METHOD, AND COMPUTER PROGRAM

TECHNICAL FIELD

The present invention relates to a data processing technology and particularly to an information processing system, an information processing method, and a computer program.

BACKGROUND ART

A system has been developed that displays a panoramic image on a head-mounted display and that displays a panoramic image commensurate with a line-of-sight direction when a user wearing the head-mounted display rotates his or her head. Using a head-mounted display provides an enhanced sense of immersion into a virtual space.

CITATION LIST

Patent Literature

[PTL 1] PCT Patent Publication No. WO2017/110632

SUMMARY

Technical Problem

Against a backdrop of a variety of applications that allows users to experience a virtual reality space now available, there is a demand to present highly entertaining viewing experiences to the users watching the virtual reality space.

The present invention has been devised in light of such a problem, and it is an object thereof to present a highly entertaining viewing experience to users watching a virtual space.

Solution to Problem

In order to solve the above problem, an information processing system according to a mode of the present invention includes an acquisition section, a generation section, and an output section. The acquisition section acquires a first image obtained by imaging a real space. The generation section generates a display image by merging the first image acquired by the acquisition section, into a second image representing a virtual space to be presented to a user wearing a head-mounted display, the display image being configured such that the first image has an inconspicuous border. The output section displays the display image generated by the generation section, on the head-mounted display.

Another mode of the present invention is an information processing method. The information processing method causes a computer to perform a step of acquiring a first image obtained by imaging a real space, a step of generating a display image by merging the first image into a second image representing a virtual space to be presented to a user wearing a head-mounted display, the display image being configured such that the first image has an inconspicuous border, and a step of displaying the display image on the head-mounted display.

It should be noted that any combination of the above constituent elements and conversions of expressions of the present invention between an apparatus, a computer program, a recording medium having a computer program recorded therein in a readable manner, a head-mounted display including functions of the above information processing apparatus, and the like are also effective as modes of the present invention.

Advantageous Effect of Invention

According to the present invention, it is possible to present a highly entertaining viewing experience to users watching a virtual space.

BRIEF DESCRIPTION OF DRAWINGS

FIG. 12 is a diagram describing size adjustment in a virtual space.

DESCRIPTION OF EMBODIMENTS

Hereinafter, the term "image" in examples can include both a video image and a still image unless otherwise specified. Also, the term "video image" in the examples can be replaced by a still image.

First Example

A description will be given first of an entertainment system of a first example. The entertainment system of the example displays a video image of a virtual space (hereinafter also referred to as a "VR video image") as a display image on a head-mounted display (hereinafter also referred to as an "HMD") worn by a user on his or her head. The VR video image in the example includes a "live video image" as a first image obtained by imaging an event in a real space such as a sports game, theater, or a concert and a "venue video image" as a second image representing a virtual space that imitates a venue where the event is held. The entertainment system of the example is intended to present, to users, an experience that makes them feel as if they are watching an event in progress (hereinafter also referred to as a "live event") at the event.

The present inventor has found that, if a live video image has a conspicuous border in a VR video image (in other words, if there is a conspicuous boundary between a live video image and a venue video image), users would perceive the live video image and the venue video image as separate, thus making it less likely for the users to have a sensation as if an event takes place in front of them. In other words, it becomes less likely for the users to have a sensation as if they are watching an event in progress at the event. Therefore, the entertainment system of the example generates a VR video image configured such that a live video image has an inconspicuous border. This makes it more likely for the users to have a sensation as if they are watching an event in progress at the event, thus allowing for presentation of highly entertaining viewing experiences to the users.

Figure 1:
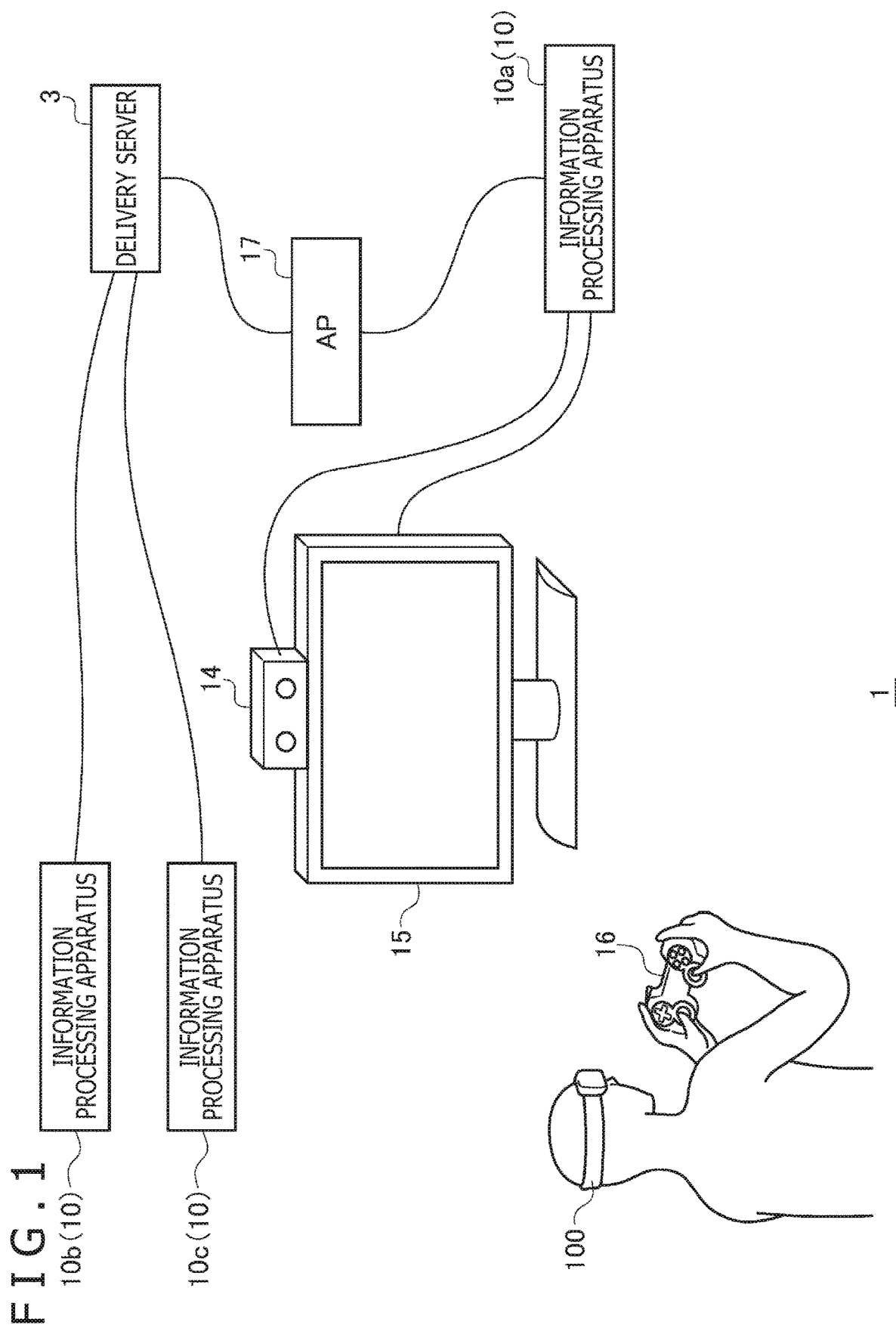
FIG. 1 is a diagram illustrating a configuration of an entertainment system according to a first example.

FIG. 1 illustrates a configuration of an entertainment system 1 according to the first example. The entertainment system 1 includes an information processing apparatus 10a, an HMD 100, an input apparatus 16, an imaging apparatus 14, an output apparatus 15, and a delivery server 3. The input apparatus 16 is a controller of the information processing apparatus 10 operated by a user with his or her fingers. The output apparatus 15 is a television or monitor that displays an image.

The delivery server 3 delivers, on a real time basis, a live video image of a sports game, concert, or the like captured by an unillustrated camera, to the information processing apparatus 10a. The delivery server 3 may stream and send data of a live video image to the information processing apparatus 10a according to a predetermined streaming protocol.

The information processing apparatus 10a performs a variety of data processing tasks for displaying a VR video image on the HMD 100. The information processing apparatus 10a detects a user's line-of-sight direction according to posture information of the HMD 100 and displays a VR video image commensurate with the line-of-sight direction on the HMD 100. The information processing apparatus 10a may be any one of a PC (Personal Computer), a stationary gaming console, a portable gaming console, a smartphone, and a tablet terminal.

The imaging apparatus 14 is a camera apparatus that images the user wearing the HMD 100 and a space around the user at predetermined intervals. The imaging apparatus 14 is a stereo camera and supplies a captured image to the information processing apparatus 10. As described later, the HMD 100 has a marker (tracking LED (Light Emitting Diode)) for tracking a user's head, thus allowing for the information processing apparatus 10a to detect motions (e.g., position, posture, and changes thereof) of the HMD 100 on the basis of a marker's position included in a captured image.

It should be noted that the HMD 100 has a posture sensor (acceleration and gyro sensors) mounted thereof and that the information processing apparatus 10a performs a highly accurate tracking process by acquiring sensor data detected by the posture sensor from the HMD 100 and using the sensor data in combination with an image obtained by imaging the marker. It should be noted that, as for such a tracking process, a variety of techniques have been proposed to date and that any tracking technique may be used as long as the information processing apparatus 10a can detect motions of the HMD 100.

Because the user watches an image with the HMD 100, the output apparatus 15 is not always required for the user wearing the HMD 100. However, having ready the output apparatus 15 allows for other user to watch a display image on the output apparatus 15. The information processing apparatus 10a may display, on the output apparatus 15, the same image as that watched by the user wearing the HMD 100 or other images. For example, in the case where the user wearing the HMD 100 and another user (e.g., friend) watch video image content together, video image content as seen from a viewpoint of the other user may be displayed on the output apparatus 15.

An AP 17 has functions of a wireless access point and a router. The information processing apparatus 10a may be connected to the AP 17 by a cable or a known wireless communication protocol. The information processing apparatus 10a is connected to the delivery server 3 on an external network via the AP 17.

The entertainment system 1 further includes an information processing apparatus 10b and an information processing apparatus 10c operated by other users different from the user of the information processing apparatus 10a. The information processing apparatuses 10b and 10c both have similar functions to those of the information processing apparatus 10a and are connected to the HMDs 100 (not depicted) and the input apparatuses 16 (not depicted) worn by the other users. That is, the respective users of the information processing apparatuses 10a, 10b, and 10c put on the HMDs 100 and watch a VR video image including a live video image delivered from the delivery server 3. Hereinafter, the information processing apparatuses 10a, the information processing apparatus 10b, and the information processing apparatus 10c will be referred to as the "information processing apparatuses 10" in the case where they are collectively referred to.

Figure 2:
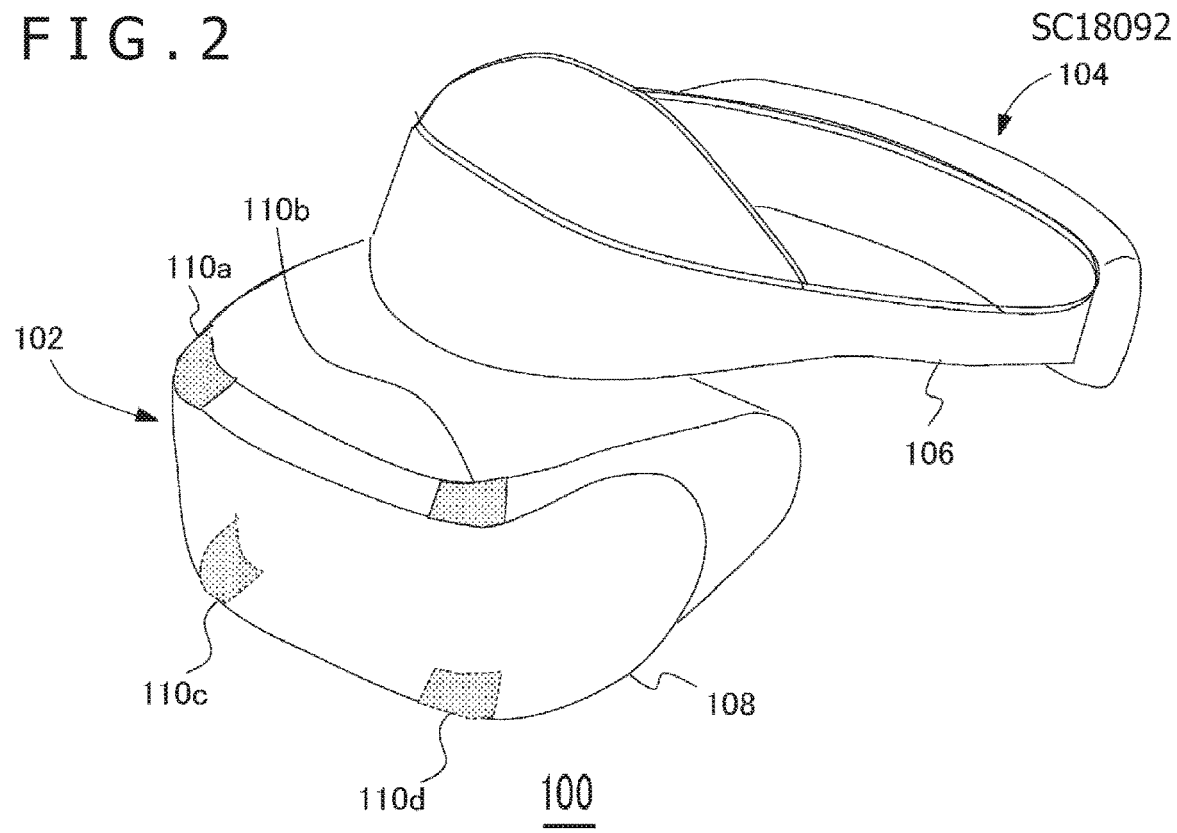
FIG. 2 is a diagram illustrating an appearance of an HMD (Head-mounted Display) depicted in FIG. 1.

FIG. 2 illustrates an appearance of the HMD 100 illustrated in FIG. 1. The HMD 100 includes an output mechanism 102 and an attachment mechanism 104. The attachment mechanism 104 includes an attachment band 106 that goes around the head to fasten the HMD 100 to the head when the HMD 100 is worn by the user. The attachment band 106 has a material or structure that permits adjustment of its length to suit a user's head circumference.

The output mechanism 102 includes a housing 108 shaped to cover left and right eyes with the HMD 100 worn by the user and incorporates a display panel that faces the eyes when the HMD 100 is worn. The display panel may be a liquid crystal panel, an organic EL (Electroluminescent) panel, or the like. The housing 108 further incorporates a pair of left and right optical lenses located between the display panel and the user's eyes and used for increasing a user's viewing angle. The HMD 100 may further include speakers or earphones at positions corresponding to user's ears and may be configured such that an external headphone is connected.

Light-emitting markers 110a, 110b, 110c, and 110d are provided on an external surface of the housing 108. While including tracking LEDs in this case, the light-emitting markers may be other type of markers. In any case, any markers are acceptable as long as they can be imaged by the imaging apparatus 14 for performing image analysis of marker positions by the information processing apparatus 10. Although the number and arrangement of the light-emitting markers 110 are not specifically limited, an appropriate number and arrangement thereof are required to permit detection of the posture of the HMD 100. In the example illustrated, the markers are provided at four corners on a front face of the housing 108. Further, the light-emitting markers 110 may be provided on a lateral or rear portion of the attachment band 106 in order to image markers even when the user turns his or her back on the imaging apparatus 14.

The HMD 100 may be connected to the information processing apparatus 10 by a cable or a known wireless communication protocol. The HMD 100 sends sensor data detected by the posture sensor to the information processing apparatus 10 and receives image data generated by the information processing apparatus 10 and then displays the image data on the left and right eye display panels.

Figure 3:
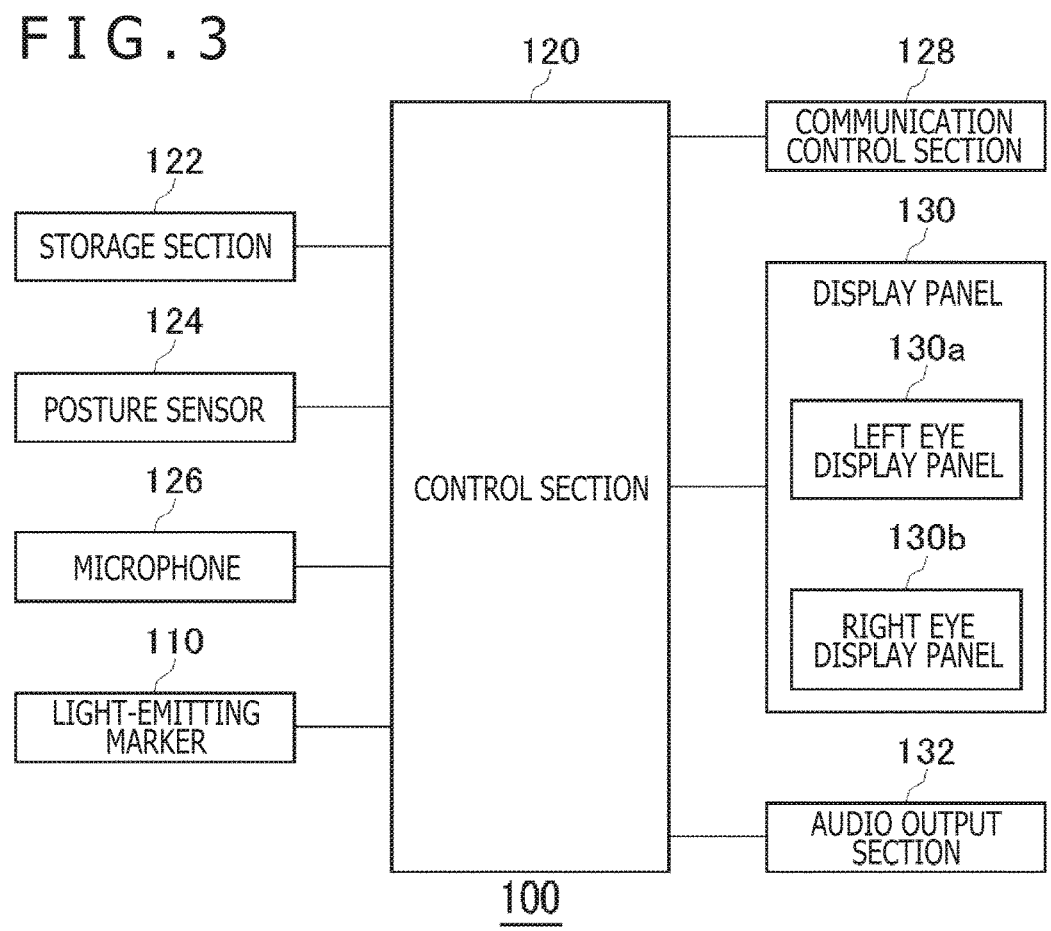
FIG. 3 is a block diagram illustrating functional blocks of the HMD depicted in FIG. 1.

FIG. 3 is a block diagram illustrating functional blocks of the HMD 100 depicted in FIG. 1. The plurality of functional blocks illustrated in the block diagram of the present specification can be built with circuit blocks, memories, and other LSI (Large Scale Integration) in terms of hardware and can be realized as a result of execution of a program loaded into a memory by a CPU (Central Processing Unit) in terms of software. Therefore, it is to be understood by those skilled in the art that these functional blocks can be realized in various ways by hardware alone, software alone, or a combination thereof and are not limited to any one of them.

A control section 120 is a main processor that processes and outputs instructions and a variety types of data including image data, audio data, sensor data, and other data. A storage section 122 temporarily stores data and instructions processed by the control section 120. A posture sensor 124 detects posture information of the HMD 100. The posture sensor 124 includes at least a triaxial acceleration sensor and a triaxial gyro sensor.

A communication control section 128 sends data output from the control section 120, to the external information processing apparatus 10 through wired or wireless communication via a network adapter or an antenna. Also, the communication control section 128 receives data from the information processing apparatus 10 through wired or wireless communication via a network adapter or an antenna and outputs the data to the control section 120.

When image or audio data is received from the information processing apparatus 10, the control section 120 supplies the data to a display panel 130 for display or to an audio output section 132 for audio output. The display panel 130 includes a left eye display panel 130a and a right eye display panel 130b, allowing a pair of parallax images to be displayed on the respective display panels. Also, the control section 120 sends sensor data acquired from the posture sensor 124 and audio data acquired from a microphone 126, from the communication control section 128 to the information processing apparatus 10.

Figure 4:
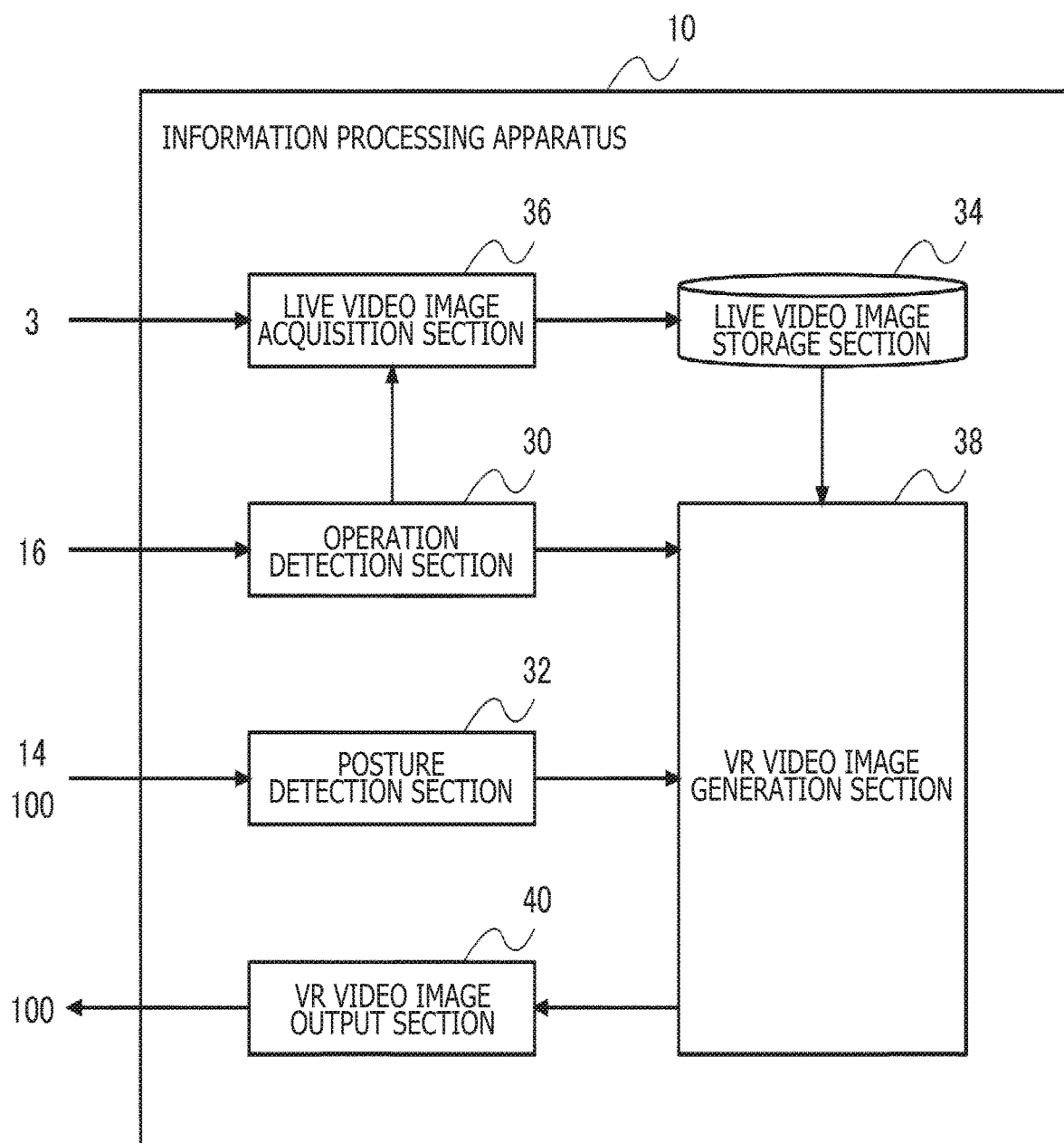
FIG. 4 is a block diagram illustrating functional blocks of an information processing apparatus of the first example.

FIG. 4 is a block diagram illustrating functional blocks of the information processing apparatus 10 of the first example. The information processing apparatus 10 includes an operation detection section 30, a posture detection section 32, a live video image storage section 34, a live video image acquisition section 36, a VR video image generation section 38, and a VR video image output section 40.

At least some of the plurality of functional blocks illustrated in FIG. 4 may be implemented as modules of a computer program (live video image viewing App in the example). The live video image viewing App may be stored in a recording medium such as a DVD (Digital Versatile Disc), and the information processing apparatus 10 may read out the live video image viewing App from the recording medium and store it in a storage. Also, the information processing apparatus 10 may download the live video image viewing App from a server on a network and store it in a storage. The CPU or GPU (Graphics Processing Unit) of the information processing apparatus 10 may deliver functionality of each functional block illustrated in FIG. 4 by loading the live video image viewing App into a main memory for execution.

The operation detection section 30 detects user operation input to the input apparatus 16 and notified from the input apparatus 16. The operation detection section 30 notifies the detected user operation to other functional blocks.

The posture detection section 32 detects the position and posture of the HMD 100 on the basis of a captured image output from the imaging apparatus 14 and posture information output from the posture sensor 124 of the HMD 100, by using a known head tracking technique. In other words, the posture detection section 32 detects the head position and posture of the user wearing the HMD 100. Also, the posture detection section 32 detects the user's line-of-sight direction according to the position and posture of the HMD 100, by using a known technique.

The live video image storage section 34 temporarily stores live video image data. The live video image acquisition section 36 requests the delivery server 3 to provide a live video image specified by the user, acquires live video image data sent from the delivery server 3, and stores the data in the live video image storage section 34.

The VR video image generation section 38 generates VR video image data according to the user action detected by the operation detection section 30, the posture of the HMD 100 detected by the posture detection section 32, and the user's line-of-sight direction. The VR video image output section 40 outputs the VR video image data generated by the VR video image generation section 38 to the HMD 100 for display on the HMD 100. The VR video image output section 40 can also be referred to as a display control section that controls contents displayed on the HMD 100.

A detailed description will be given of a configuration of the VR video image generation section 38 of the example. The VR video image generation section 38 generates venue video image data including a screen region and having a mode consistent with the posture of the HMD 100 detected by the posture detection section 32 and the user's line-of-sight direction. The VR video image generation section 38 generates VR video image data by merging the live video image acquired by the live video image acquisition section 36 into the screen region of the venue video image (in other words, pasting the live video image).

Also, the VR video image generation section 38 generates a VR video image configured such that the live video image has an inconspicuous border. A border of a live video image can also be referred to as a fringe of a live video image or a boundary between the live video image and the venue video image. In the example, the VR video image generation section 38 generates a venue video image including an image of a shield covering (in other words, hiding) at least part of the border of the live video image.

Figure 5:
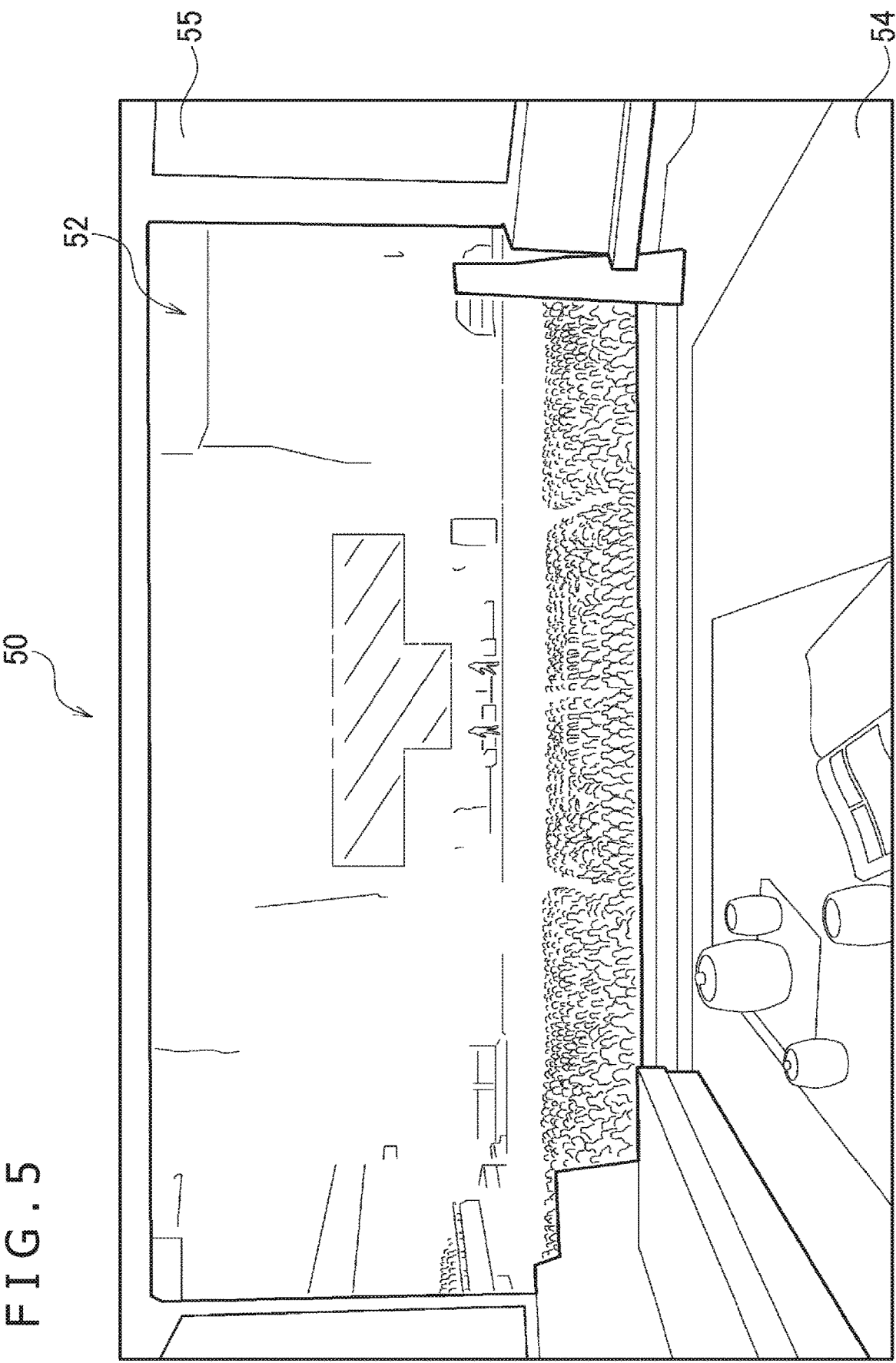
FIG. 5 is a diagram illustrating an example of a VR (Virtual Reality) video image.

FIG. 5 is a diagram illustrating an example of a VR video image. As described earlier, a VR video image 50 is obtained by merging a live video image 52 into a screen region in a venue video image 54. The live video image 52 represents a state of a concert being held. The venue video image 54 represents a virtual space imitating the inside of a box-seat room (what is called a VIP (Very Important Person) room) in a concert venue.

The venue video image 54 includes an image of a shield that is suited to, in other words, is in harmony with, the type of virtual space (box-seat room in FIG. 5) represented by the video image in question. In FIG. 5, a wall, a curtain, and furnishings (e.g., speaker) of the box-seat room correspond to shields. In the venue video image 54, these shields are arranged at the border of the live video image 52 (can also be referred to as the border of the screen region), in other words, at a boundary between the live video image 52 and the venue video image 54. This renders the border of the live video image 52 inconspicuous without causing the user watching the VR video image 50 to feel a sense of unnaturalness, thus making it more likely for the user to have a sensation as if he or she is at the scene of the live event.

Figure 6:
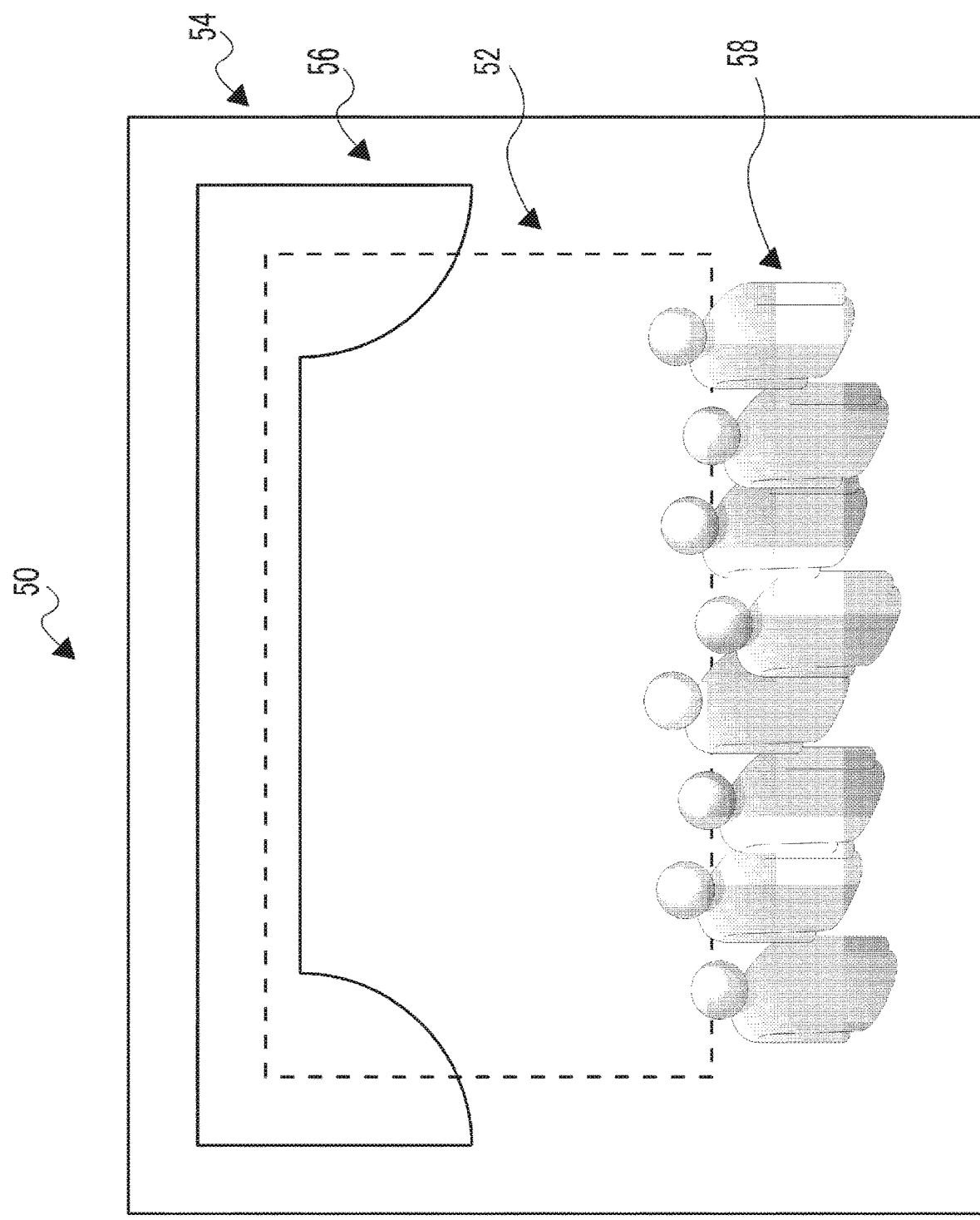
FIG. 6 is a schematic diagram of a VR video image.

FIG. 6 is a schematic diagram of a VR video image. The live video image 52 depicted by a dashed line in FIG. 6 illustrates a state of a live event being held on stage. The venue video image 54 illustrates a virtual audience seat space in front of the stage. The venue video image 54 includes, as an image of a shield, an image representing furnishings on the stage (furnishings image 56 in FIG. 6). The furnishings image 56 may be an image representing stage columns, a drop curtain, lighting equipment, or speakers.

Also, the venue video image 54 includes, as an image of a shield, a character image 58 representing other users watching the same live event or NPCs (Non Player Characters). As described above, in the case where a live event is held on stage, the border of the live video image 52 may be covered with furnishings on the stage or with heads or bodies of characters watching the live event. This renders the border of the live video image 52 inconspicuous without causing the user watching the VR video image 50 to feel a sense of unnaturalness, thus making it more likely for the user to have a sensation as if he or she is at the scene of the live event.

A description will be given of operation of the entertainment system 1 configured as described above.

The user starts the live video image viewing App on the information processing apparatus 10 (e.g., information processing apparatus 10*a*). The operation detection section 30 detects user operation in which a live event to be watched is selected, on the basis of a signal received from the input apparatus 16. The live video image acquisition section 36 acquires, from the delivery server 3, data of the live video image selected by the user among the plurality of live video images that can be delivered by the delivery server 3, storing the data in the live video image storage section 34.

The posture detection section 32 detects the posture of the HMD 100 and the user's line-of-sight direction according to an image captured by the imaging apparatus 14 and posture information sent from the HMD 100. The VR video image generation section 38 generates a venue video image consistent with the posture of the HMD 100 and the user's line-of-sight direction and generates a VR video image by merging a live video image into a screen region of the venue video image. The venue video image includes an image of a shield covering at least part of the border of the live video image, and the VR video image generation section 38 generates a left eye VR video image and a right eye VR video image configured such that the live image has an inconspicuous border.

The VR video image output section 40 sends the left eye VR video image and the right eye VR video image generated by the VR video image generation section 38, to the HMD 100. The HMD 100 displays the left eye VR video image received from the information processing apparatus 10 on the left eye display panel 130*a* and displays the right eye VR video image on the right eye display panel 130*b*. According to the entertainment system 1 of the example, it is possible to give the user a sensation as if he or she is at the venue where the live event is being held, thus presenting a highly entertaining VR viewing experience to the user.

The present invention has been described so far on the basis of the first example. The first example is illustrative, and it is to be understood by those skilled in the art that combinations of respective constituent elements or respective processes can be modified in various ways and that these modifications also fall within the scope of claims of the present invention.

A modification will be described. In the above example, shields are provided in an image to hide a border of a live video image in order to render the border of the live video image inconspicuous in a VR video image. As the modification, the VR video image generation section 38 may render a border of a live video image inconspicuous in a VR video image by generating a VR video image in which a boundary between the live video image and a venue video image is at least partially unclear.

Figure 7:
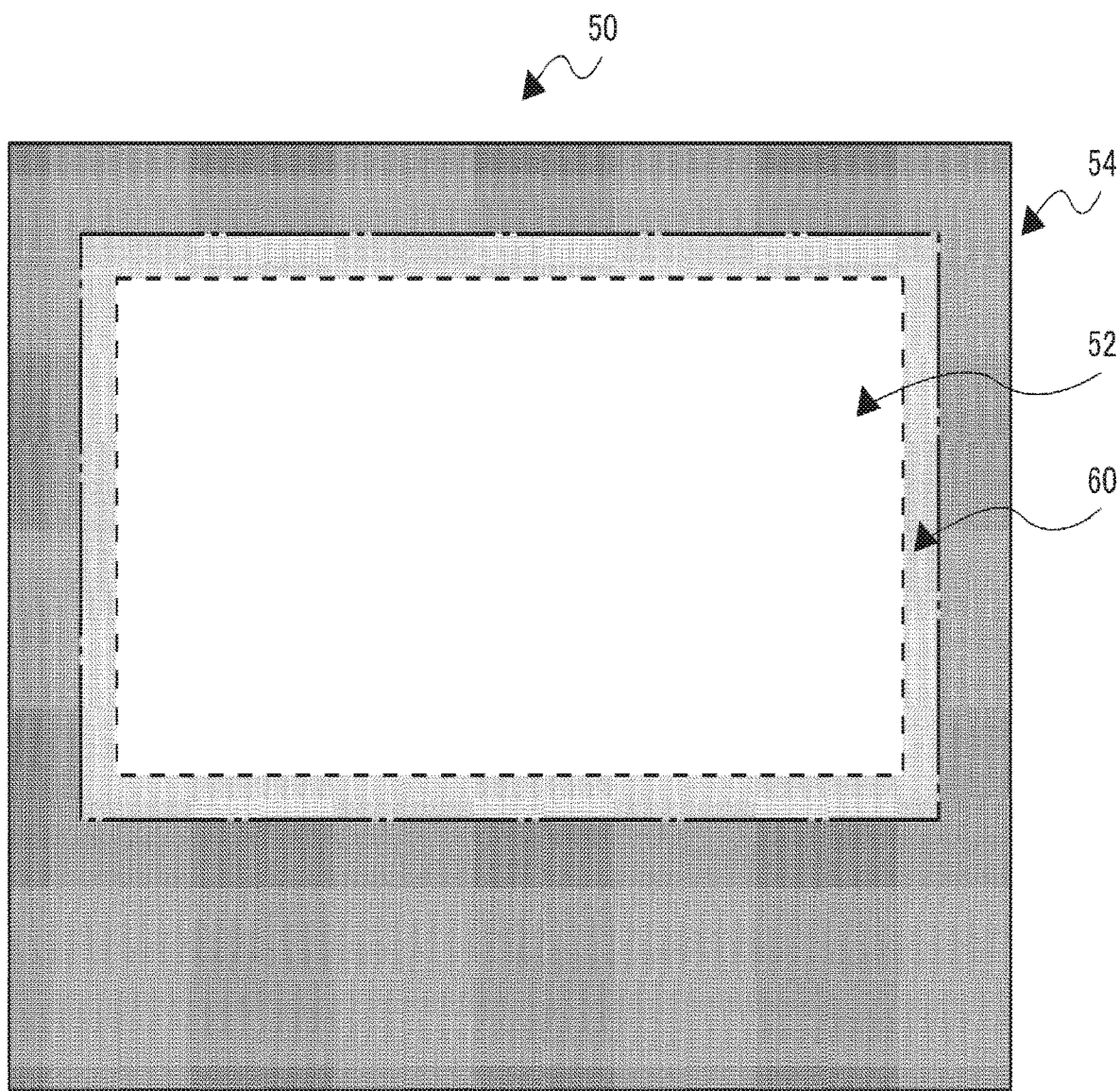
FIG. 7 is a schematic diagram of a VR video image.

FIG. 7 is a schematic diagram of a VR video image. As described earlier, the live video image 52 is merged into the screen region (region enclosed by a dashed line in FIG. 7) of the venue video image 54 in the VR video image 50. In the present modification, a region that is part of the venue video image 54 and in proximity to the live video image 52 will be referred to as a "boundary region 60." The boundary region 60 is a region enclosed by a dashed line and a long dashed short dashed line in FIG. 7 and can also be referred to as a region of the venue video image 54 close to a boundary with the live video image 52 (in other words, the screen region). The size (width) of the boundary region 60 may be approximately several to 10 pixels, and it is sufficient that a suitable value is determined empirically by using the entertainment system 1 or by other means.

As a first procedure of rendering the boundary between the live video image and the venue video image unclear, the VR video image generation section 38 may choose, as a color of the boundary region 60 in the venue video image 54, a color closely analogous to that of a portion of the live video image 52 close to the boundary (i.e., border portion). For example, (1) the VR video image generation section 38 may acquire not only the color (e.g., RGB data) of a portion of the live video image 52 close to the boundary but also the color of the venue video image 54 outside the boundary region 60 (region in proximity to the boundary region 60). The VR video image generation section 38 may set, for the boundary region 60, an intermediate color between the color of the portion of the live video image 52 close to the boundary and the color of the venue video image 54 outside the boundary region 60.

Also, (2) the VR video image generation section 38 may acquire not only the color of the portion of the live video image 52 close to the boundary but also the color of the venue video image 54 outside the boundary region 60. The VR video image generation section 38 may set, for the boundary region 60, an image in such a manner that gradually transforms in color from that of the portion of the live video image 52 close to the boundary to that of the venue video image 54 outside the boundary region 60 (i.e., gradation image).

Also, (3) the VR video image generation section 38 may extract a feature color of the portion of the live video image 52 close to the boundary and merge elements of the feature color into an original color of the boundary region 60. The feature color may be, for example, a color that gives a strong impression to users and be extracted by a known technique.

As a second procedure of rendering the boundary between the live video image and the venue video image unclear, the VR video image generation section 38 may set the boundary region 60 in the venue video image 54 to a relatively low image quality. For example, the VR video image generation section 38 may correct the boundary region 60 such that an edge of the boundary region 60 in the venue video image 54 is less highlighted than those of other regions of the venue video image 54. Also, the VR video image generation section 38 may correct the boundary region 60 such that the boundary region 60 in the venue video image 54 undergoes a milder change in color than other regions of the venue video image 54. Also, the VR video image generation section 38 may correct the boundary region 60 such that the boundary region 60 is blurred by removing high frequency components from the boundary region 60 in the venue video image 54 or by other means.

The configuration of this modification also renders the border of the live video image 52 inconspicuous without causing the user to feel a sense of unnaturalness, similarly to the example. Thus, it makes more likely for the user to have a sensation as if he or she is at the venue where the live event is being held.

Another modification will be described. Data of a plurality of types of live video images may be stored in advance in the live video image storage section 34. The live video image acquisition section 36 may acquire data of the live video image selected by the user, from the plurality of live video images stored in the live video image storage section 34, and hand over the acquired data to the VR video image generation section 38.

A still another modification will be described. The delivery server 3 may have some of the functions of the information processing apparatus 10 described in the example. For example, the delivery server 3 may generate VR video image data and send the data to the information processing apparatus 10, and the information processing apparatus 10 may display a VR video image on the HMD 100 by sending the VR video image data to the HMD 100. That is, the VR video image described in the example may be realized by an information processing system in which the delivery server 3, the information processing apparatus 10, and the HMD 100 function in coordinated fashion.

Second Example

An entertainment system 1 of a second example is intended to present a highly entertaining VR viewing experience to users, similarly to the entertainment system 1 of the first example. The entertainment system 1 of the second example is configured similarly to the entertainment system 1 of the first example (FIG. 1). A description will be given below with emphasis on differences from the first example, and the description in common will be omitted. Also, of the elements included in the entertainment system 1 of the second example, the elements identical or corresponding to those described in the first example will be denoted by the same reference signs for description.

Figure 8:
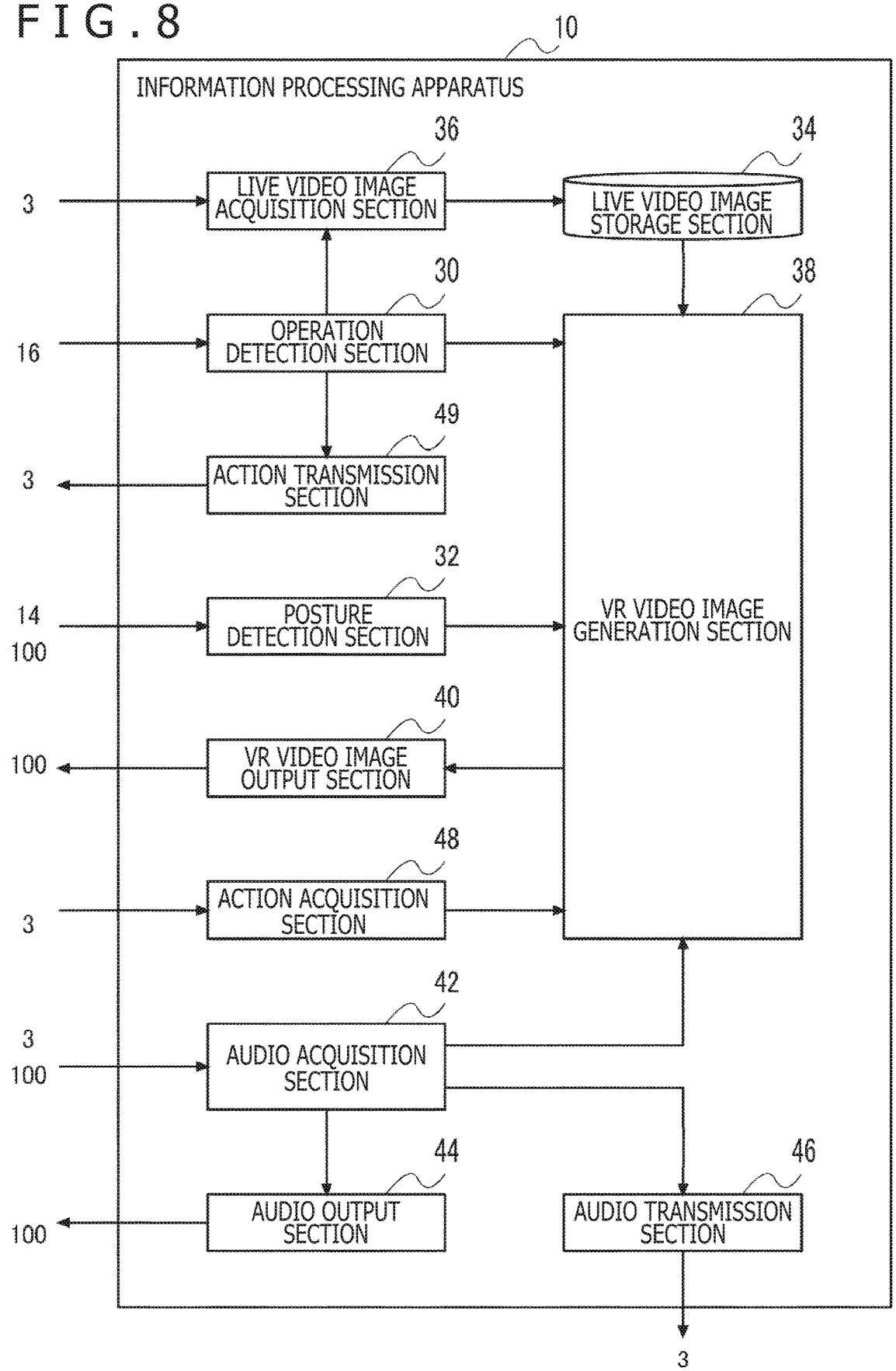
FIG. 8 is a block diagram illustrating functional blocks of an information processing apparatus of a second example.

FIG. 8 is a block diagram illustrating functional blocks of an information processing apparatus 10 of the second example. The information processing apparatus 10 of the second example includes an audio acquisition section 42, an audio output section 44, an audio transmission section 46, an action acquisition section 48, and an action transmission section 49 in addition to the functional blocks described in the first example.

The audio acquisition section 42 acquires, from the HMD 100, audio data regarding the sound produced by the user of the own apparatus (user of the information processing apparatus 10a in the second example), i.e., audio data acquired by the microphone 126 of the HMD 100 (hereinafter also referred to as "own apparatus audio data"). Also, the audio acquisition section 42 acquires, from the delivery server 3, audio data (hereinafter also referred to as "other apparatus audio data") regarding the sound produced by other users watching the same live event (users of the information processing apparatus 10b and the information processing apparatus 10c in the second example). The exchange of audio data takes place between the plurality of users (between the plurality of information processing apparatuses 10) through the delivery server 3.

The audio output section 44 sends other apparatus audio data acquired by the audio acquisition section 42, to the HMD 100, causing an audio produced by other user to be output from the audio output section 132 of the HMD 100. Actually, the delivery server 3 sends the audio data to the information processing apparatus 10 together with a live event video image. The audio output section 44 sends live event audio data and other apparatus audio data to the HMD 100.

The audio transmission section 46 sends own apparatus audio data acquired by the audio acquisition section 42, to the delivery server 3. The delivery server 3 transfers the own apparatus audio data to the other information processing apparatuses 10 (the information processing apparatus 10b and the information processing apparatus 10c).

The posture detection section 32 detects the user's line-of-sight direction of the information processing apparatus 10a (i.e., own apparatus), similarly to the first example. Further, in the second example, the posture detection section 32 acquires the users' line-of-sight directions of the information processing apparatuses 10b and 10c (i.e., other apparatuses) from the delivery server 3. Each of the information processing apparatuses 10a, 10b, and 10c sends data indicating the user's line-of-sight direction to the delivery server 3, and the delivery server 3 transfers the data indicating the line-of-sight direction of each user to each of the information processing apparatuses.

The action acquisition section 48 acquires, from the delivery server 3, operation data of user characters input to the other information processing apparatuses 10 (information processing apparatuses 10b and 10c in the second example) by other users. This operation data specifies actions of characters of the other users appearing in a VR video image and will hereinafter also be referred to as "other character operation data."

The operation detection section 30 acquires, from the input apparatus 16, operation data of a user character input to the own apparatus (information processing apparatus 10a in the second example) by the user. This operation data specifies actions of the character of the user appearing in a VR video image and will hereinafter also be referred to as "own character operation data."

The action transmission section 49 sends own character action data detected by the operation detection section 30, to the delivery server 3. The exchange of operation data takes place between the plurality of users through the delivery server 3. That is, the delivery server 3 transfers the operation data of the own character operation data to the other information processing apparatuses 10 (information processing apparatuses 10b and 10c in the second example).

For example, own character operation data and other character operation data may give a character any of instructions including holding up its hands, jumping, waving its left hand, and waving its right hand. The VR video image generation section 38 generates a VR video image in which the user character of the own apparatus makes a motion according to own character operation data, and VR video images in which the user characters of the other apparatuses make motions according to other character operation data.

As a first feature of the entertainment system 1 of the second example, each user's voice (in other words, spoken words) is visualized in a VR space. The VR video image generation section 38 generates a VR video image by visualizing voices of a plurality of users watching a live event, on the basis of own apparatus audio data and other apparatus audio data acquired from the audio acquisition section 42.

Figure 9:
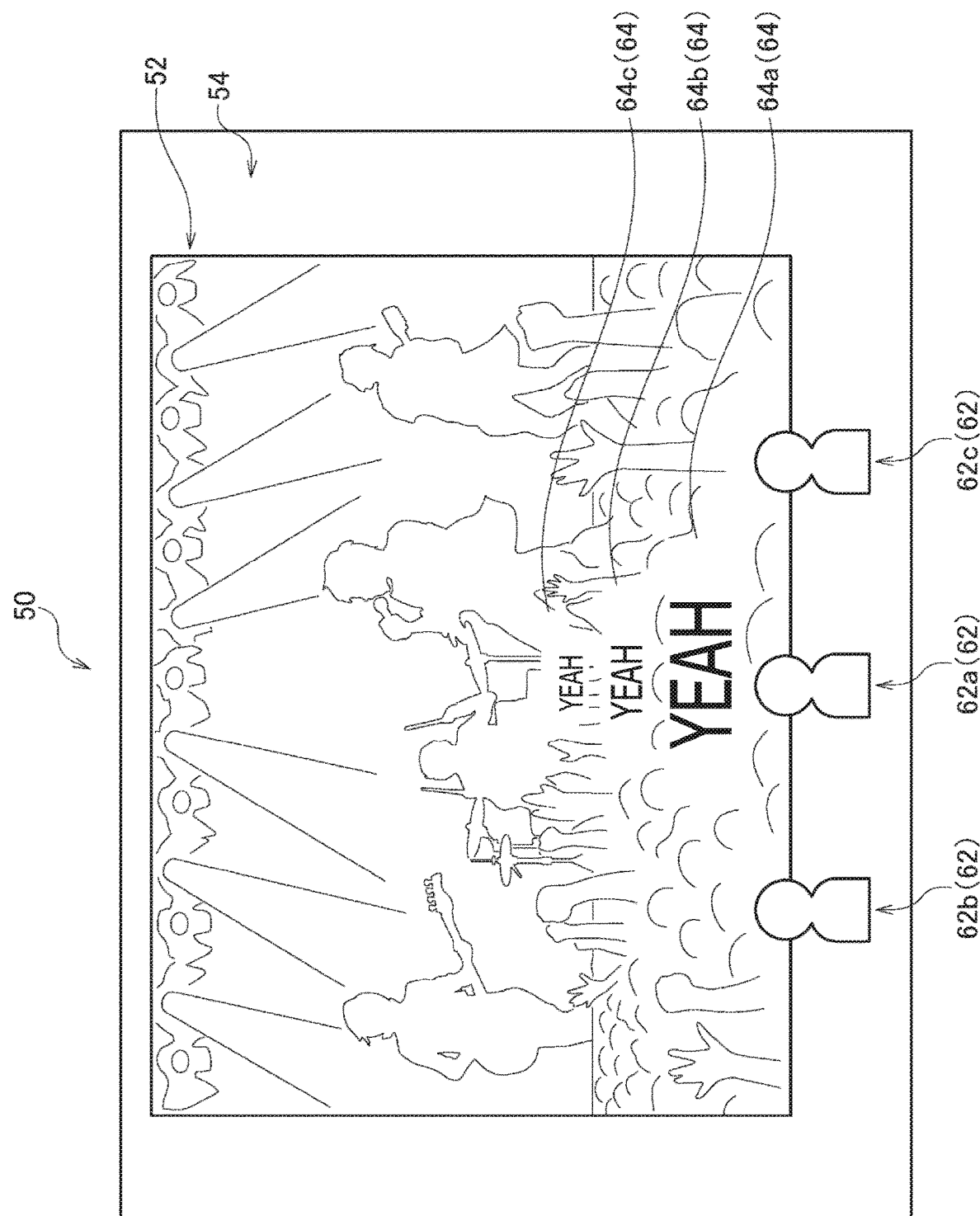
FIG. 9 is a diagram illustrating an example of a VR video image.

FIG. 9 illustrates an example of a VR video image. The VR video image 50 of the second example is obtained by merging the live video image 52 into the screen region of the venue video image 54, similarly to the first example. Also, the venue video image 54 includes a plurality of avatar images 62 representing characters corresponding to a plurality of users watching the live video image 52. The plurality of avatar images 62 include an avatar image 62a corresponding to the user of the information processing apparatus 10a (own apparatus) and avatar images 62b and 62c corresponding to the users of the information processing apparatuses 10b and 10c (other apparatuses).

In the case where own apparatus audio data is acquired by the audio acquisition section 42, the VR video image generation section 38 generates text images (voice images 64) representing contents of audio (i.e., words spoken by the user of the own apparatus) indicated by own apparatus audio data. The VR video image generation section 38 generates the VR video image 50 such that the voice images 64 float toward the line-of-sight direction of the user of the own apparatus detected by the posture detection section 32. In the case where the line-of-sight direction of the user of the own apparatus is directed to the front, the voice image 64 transforms in sequence from a voice image 64a to a voice image 64b and to a voice image 64c as illustrated in FIG. 9. That is, the voice image 64 is displayed such that it moves away from the avatar image 62a toward the line-of-sight direction of the user of the own apparatus and diminishes gradually in size.

Further, in the case where other apparatus audio data is acquired by the audio acquisition section 42, the VR video image generation section 38 generates the voice images 64 representing contents of audio (i.e., words spoken by the users of the other apparatuses) indicated by other apparatus audio data. The VR video image generation section 38 generates the VR video image 50 such that the voice images 64 float toward the line-of-sight directions of the users of the other apparatuses detected by the posture detection section 32. In the case where own apparatus audio data and other apparatus audio data are acquired at the same time, the VR video image generation section 38 generates the VR video image 50 that includes both the voice images 64 that float from the avatar image 62a indicating the user of the own apparatus, and the voice images 64 that float from the avatar image 62b indicating the user of the other apparatuses.

It should be noted that, in synchronism with audio data output from the audio output section 44, the VR video image generation section 38 may display the voice images 64 corresponding to the audio data on the VR video image 50.

Also, audio data includes data indicating a voice volume. The VR video image generation section 38 changes at least either the size or the floating direction of the voice images 64 according to the voice volume indicated by the audio data. For example, as the voice volume indicated by the audio data increases, the VR video image generation section 38 enlarges the voice images 64 and makes the voice images 64 float in a further distance. Thus, the voice images 64 different in size and floating distance from each other float around the VR video image 50, thereby providing a more entertaining aspect.

Also, audio data may include data indicating a user's voice quality, and the VR video image generation section 38 may identify the voice quality indicated by the audio data, by a known audio analysis. The VR video image generation section 38 may change a font (typeface) of the voice images 64 according to the voice quality indicated by the audio data. For example, in the case where the voice quality indicated by audio data is low-tone and deep, the VR video image generation section 38 may generate the voice images 64 by using an angular first font. Also, in the case where the audio data is a woman's voice, the VR video image generation section 38 may generate the voice images 64 by using a rounded second font.

As a second feature of the entertainment system 1 of the second example, synchronous staging is displayed in the case where behaviors of the respective users are synchronized. In the case where the contents of audio of own apparatus audio data and other apparatus audio data acquired at the same time by the audio acquisition section 42 are identical, the VR video image generation section 38 performs voice synchronization staging. Voice synchronization staging is staging that highlights the same word uttered by the plurality of users. In the second example, the VR video image generation section 38 displays the voice images 64 indicating the same word, in a larger-than-normal size (in a larger size than that in the case where the contents of audio are different) as voice synchronization staging. For example, letters may be larger than normal or be displayed in boldface.

Figure 10:
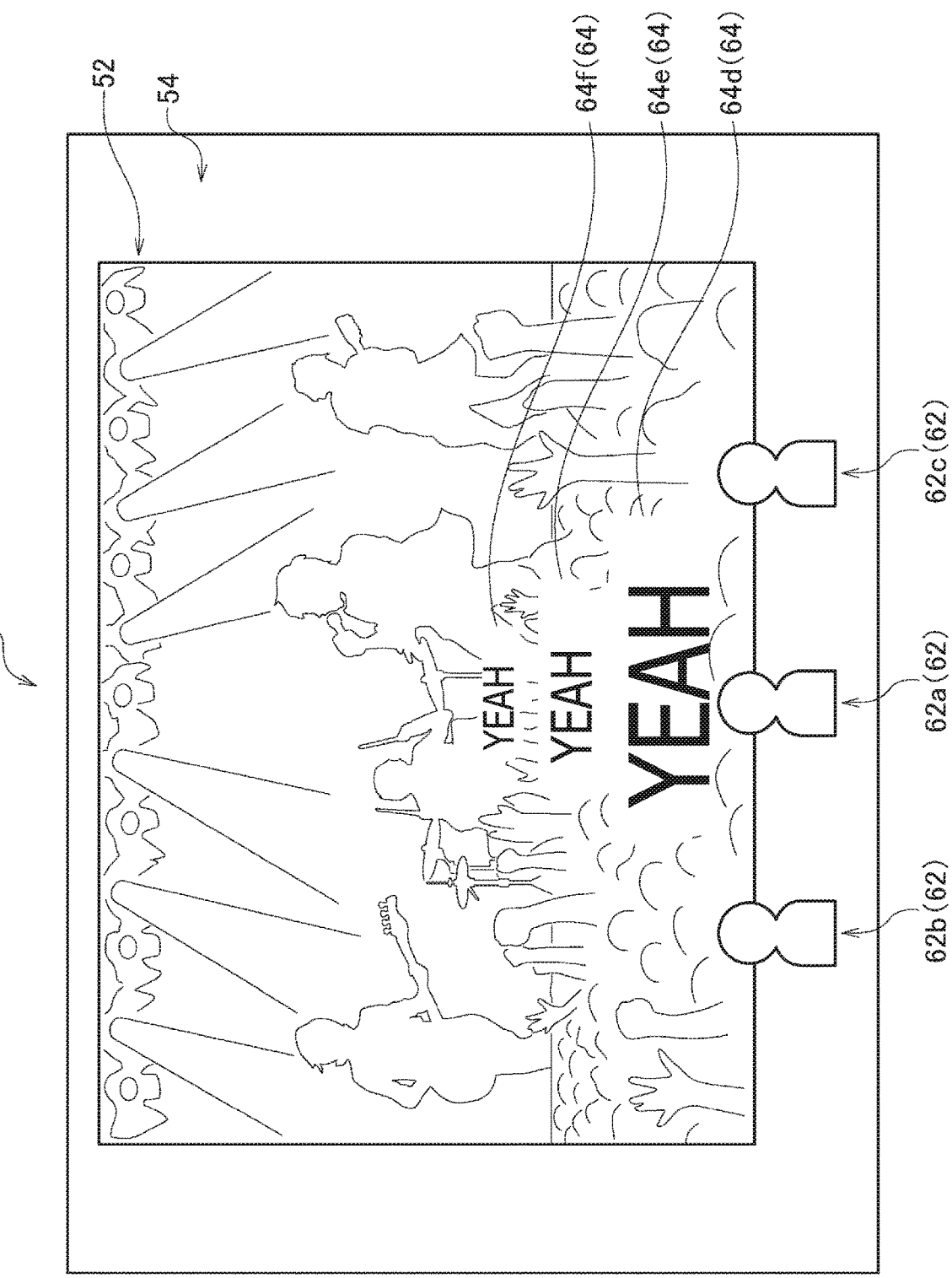
FIG. 10 is a diagram illustrating an example of a VR video image.

FIG. 10 also illustrates an example of a VR video image. FIG. 10 illustrates the VR video image 50 in the case where the user of the avatar image 62a, the user of the avatar image 62b, and the user of the avatar image 62c utter the same word at the same time. A voice image 64d in FIG. 10 corresponds to the voice image 64a in FIG. 5, a voice image 64e in FIG. 10 corresponds to the voice image 64b in FIG. 5, and a voice image 64f in FIG. 10 corresponds to the voice image 64c in FIG. 5. The respective voice images 64 in FIG. 10 are larger in size than those in FIG. 5.

It should be noted that own apparatus audio data and other apparatus audio data indicating the same word may not be acquired at the same time and that there may be several seconds of time lag therebetween. For example, in the case where, while the voice image 64 indicating a word uttered by one user is displayed in a normal size, another user utters the same word, the VR video image generation section 38 may switch to the voice image 64 having a larger-than-normal size for display. Also, as a larger number of users utter the same word and/or as the volume with which the same word is uttered by the plurality of users is higher, the VR video image generation section 38 may enlarge the voice image 64.

In the case where own character operation data and other character operation data acquired at the same time indicate the same operation contents (in other words, the same character motion), the VR video image generation section 38 causes the user character of the own apparatus (e.g., avatar image 62a) and the user characters of the other apparatuses (e.g., avatar images 62b and 62c) to make the same motion and performs action synchronization staging.

Figure 11:
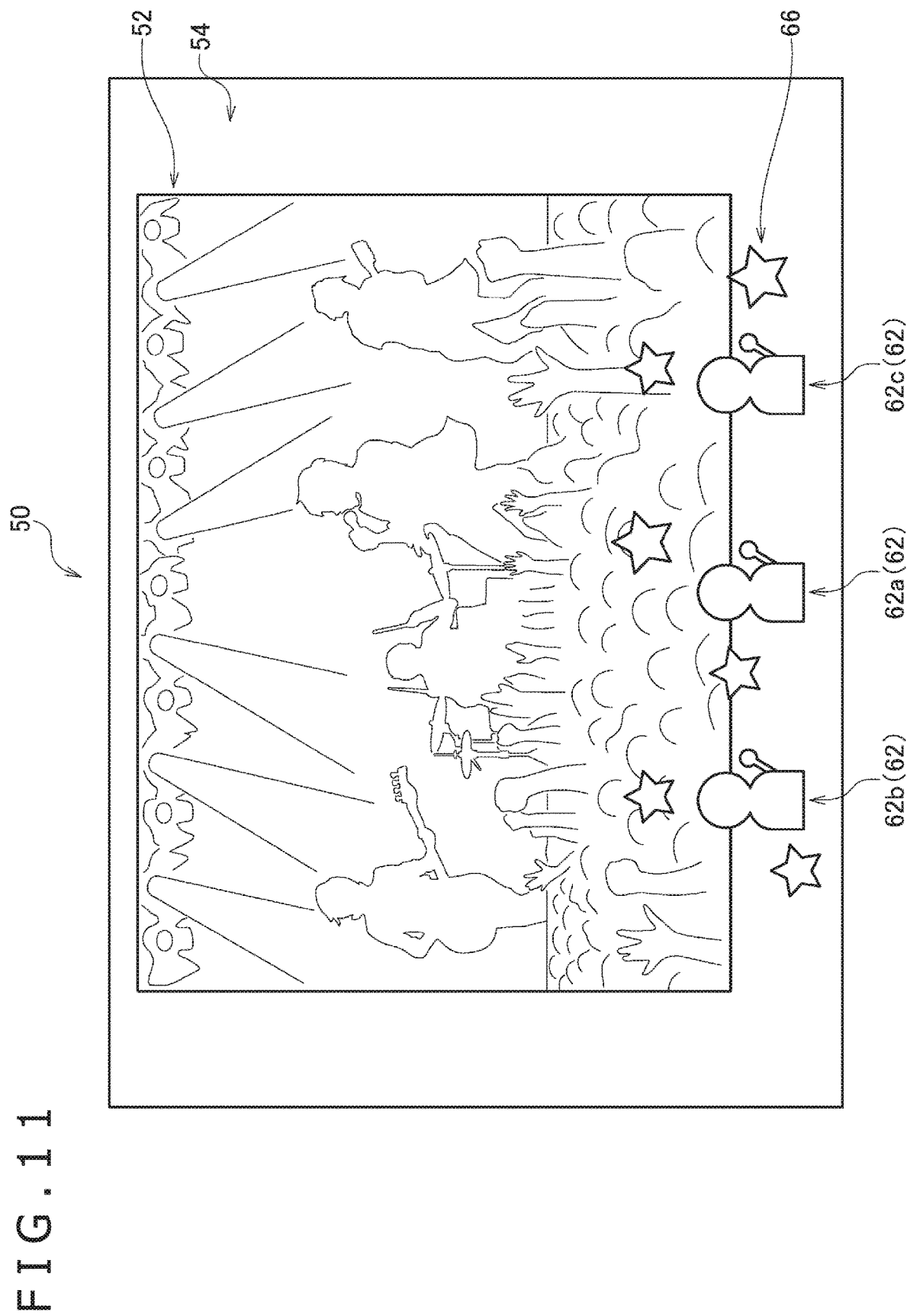
FIG. 11 is a diagram illustrating an example of a VR video image.

Action synchronization staging is staging in a specialized manner that highlights the fact that the plurality of avatar images 62 make the same motion. In the second example, the VR video image generation section 38 generates the VR video image 50 having a predetermined additional effect image, as action synchronization staging. FIG. 11 also illustrates an example of a VR video image. In the VR video image 50 in FIG. 11, the avatar images 62a, 62b, and 62c are making the same motion, that is, the avatar images 62 are all holding up their right hands. At this time, the VR video image generation section 38 sets an effect image 66 in the VR video image 50.

It should be noted that the VR video image generation section 38 may illuminate the plurality of avatar images 62 making the same motion themselves, as action synchronization staging. Also, as a larger number of users input the same character operation at the same time, the VR video image generation section 38 may perform the flashier synchronization staging (for example, may increase the number of the effect images 66 or present the flashier effect image 66 in color).

Also, own character operation data and other character operation data indicating the same operation may not be acquired at the same time, and there may be several seconds of time lag therebetween. For example, in the case where, while the avatar image 62a is making a motion in a manner indicated by own character operation data, other character operation data is acquired that indicates that the avatar image 62b makes a motion in the same manner, the VR video image generation section 38 may generate the VR video image 50 that causes the avatar image 62b to make a motion in the same manner as the avatar image 62a and that further has the effect image 66.

As described above, voice visualization and synchronization staging make it more likely for a plurality of users to foster a sense of unity, thus presenting a more entertaining VR viewing experience to the users.

The present invention has been described above on the basis of the second example. The second example is illustrative, and it is to be understood by those skilled in the art that combinations of respective constituent elements or respective processes can be modified in various ways and that these modifications also fall within the scope of claims of the present invention. Also, it is to be understood by those skilled in the art that features of the first and second examples can be combined and that the features of the second example can be implemented alone.

A description will be given of a manner of adjusting the size in a virtual space, as a modification applicable to both the first and second examples. FIG. 12 is a diagram describing size adjustment in a virtual space. A camera distance c is a distance from a stereo camera imaging a live event in a real space to the live event (i.e., subject). A viewpoint distance d is a distance from a user's viewpoint position in a virtual space to a screen (e.g., screen region of the venue video image 54 into which the live video image 52 is merged).

It is assumed here that the camera distance c and the viewpoint distance d are equal. When a user's eye-to-eye distance a (can also be referred to as a pupil-to-pupil distance) is equal to a lens-to-lens distance b in the stereo camera, an object appearing in a live video image at the same magnification appears to be a life size to the user by making the camera distance c and the viewpoint distance d equal. A screen's vertical width e, its horizontal width f, and the viewpoint distance d at that time are ideal values.

Next, in the case where the lens-to-lens distance d is 1.2 times the eye-to-eye distance a, what appears in the live video image appears to be a life size to the user by dividing the ideal value of the screen's vertical width e by 1.2 and dividing the ideal value of the screen's horizontal width f by 1.2. That is, it is preferred that, as the lens-to-lens distance b is larger than the eye-to-eye distance a, the VR video image generation section 38 reduces the screen size of the VR video image.

It should be noted that any combination of the above examples and modifications is effective as an embodiment of the present disclosure. An embodiment newly obtained by such a combination has respective advantageous effects of the example and the modification combined together. Also, it is to be understood by those skilled in the art that the functions to be delivered by respective constituent elements recited in the claims are realized by one of or coordination of the constituent elements described in the examples and modifications.

REFERENCE SIGNS LIST

1: Entertainment system
3: Delivery server
10: Information processing apparatus
30: Operation detection section
32: Posture detection section
34: Live video image storage section
36: Live video image acquisition section
38: VR video image generation section
40: VR video image output section
100: HMD

INDUSTRIAL APPLICABILITY

This invention is applicable to a system for generating an image in a virtual space.

The invention claimed is:

1. An information processing system comprising:
an acquisition section configured to acquire a first image obtained by imaging an event taking place in a real space, where the real space includes real elements that are a focus of the event and real peripheral elements establishing a venue having an entertainment setting in which the event takes place, where real elements that are the focus of the event are circumscribed by a peripheral boundary and the real peripheral elements of the venue are not within the peripheral boundary;
a generation section configured to generate a display image by merging the first image into a second image representing a virtual space that establishes an alternative version of the entertainment setting of the venue where the event takes place by: (i) reproducing the real elements that are the focus of the event up to the peripheral boundary, (ii) omitting the real peripheral elements of the venue are not within the peripheral boundary, and (iii) presenting alternative virtual elements from the peripheral boundary and outward instead of the real peripheral elements, such that the first image has an inconspicuous border at the peripheral boundary when the display image is presented to a user wearing a head-mounted display; and
an output section configured to display the display image generated by the generation section, on the head-mounted display.

2. The information processing system according to claim 1, wherein the second image includes an object covering at least part of the border of the first image.

3. The information processing system according to claim 2, wherein the object is an image of an item corresponding to a type of the virtual space represented by the second image.

4. The information processing system according to claim 2, wherein
the first image is obtained by imaging an event taking place on stage, and
the object is an image representing furnishings on a stage.

5. The information processing system according to claim 1, wherein the generation section generates a display image in which at least part of a boundary between the first image and the second image is unclear.

6. The information processing system according to claim 5, wherein the generation section choose, as a color of a portion of the second image that is close to the boundary with the first image, a color closely analogous to a color of a portion of the first image that is close to the boundary.

7. The information processing system according to claim 5, wherein the generation section sets the portion of the second image that is close to the boundary with the first image, to a relatively low image quality.

8. An information processing method causing a computer to perform:
acquiring a first image obtained by imaging an event taking place in a real space, where the real space includes real elements that are a focus of the event and real peripheral elements establishing a venue having an entertainment setting in which the event takes place, where real elements that are the focus of the event are circumscribed by a peripheral boundary and the real peripheral elements of the venue are not within the peripheral boundary;
generating a display image by merging the first image into a second image representing a virtual space that establishes an alternative version of the entertainment setting of the venue where the event takes place by: (i) reproducing the real elements that are the focus of the event up to the peripheral boundary, (ii) omitting the real peripheral elements of the venue are not within the peripheral boundary, and (iii) presenting alternative virtual elements from the peripheral boundary and outward instead of the real peripheral elements, such that the first image has an inconspicuous border at the peripheral boundary when the display image is presented to a user wearing a head-mounted display; and
displaying the display image on the head-mounted display.

9. A non-transitory, computer readable storage medium containing a computer program, which when executed by a computer, causes the computer to perform an information processing method by carrying out actions, comprising:
acquiring a first image obtained by imaging an event taking place in a real space, where the real space includes real elements that are a focus of the event and real peripheral elements establishing a venue having an entertainment setting in which the event takes place, where real elements that are the focus of the event are circumscribed by a peripheral boundary and the real peripheral elements of the venue are not within the peripheral boundary;
generating a display image by merging the first image into a second image representing a virtual space that establishes an alternative version of the entertainment setting of the venue where the event takes place by: (i) reproducing the real elements that are the focus of the event up to the peripheral boundary, (ii) omitting the real peripheral elements of the venue are not within the peripheral boundary, and (iii) presenting alternative virtual elements from the peripheral boundary and outward instead of the real peripheral elements, such that the first image has an inconspicuous border at the peripheral boundary when the display image is presented to a user wearing a head-mounted display; and
displaying the display image on the head-mounted display.

* * * * *